(12) United States Patent
Sorkine-Hornung et al.

(10) Patent No.: US 10,580,165 B2
(45) Date of Patent: Mar. 3, 2020

(54) SYSTEM FOR OPTIMIZED EMBEDDING AND ANALYSIS OF BRANDED CONTENT

(71) Applicant: DISNEY ENTERPRISES, INC., Burbank, CA (US)

(72) Inventors: Alex Sorkine-Hornung, Burbank, CA (US); Simone Meier, Burbank, CA (US); Jean-Charles Bazin, Burbank, CA (US); Sasha Schriber, Burbank, CA (US); Markus Gross, Burbank, CA (US); Oliver Wang, Burbank, CA (US)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 185 days.

(21) Appl. No.: 15/715,935

(22) Filed: Sep. 26, 2017

(65) Prior Publication Data
US 2019/0096094 A1     Mar. 28, 2019

(51) Int. Cl.
| | | |
|---|---|---|
| *G06T 7/00* | (2017.01) | |
| *G06T 7/207* | (2017.01) | |
| *H04N 19/583* | (2014.01) | |
| *G06T 11/60* | (2006.01) | |
| *H04N 21/44* | (2011.01) | |
| *H04N 21/8541* | (2011.01) | |
| *G11B 27/00* | (2006.01) | |

(52) U.S. Cl.
CPC ............... *G06T 7/97* (2017.01); *G06T 7/207* (2017.01); *G06T 11/60* (2013.01); *G11B 27/00* (2013.01); *H04N 19/583* (2014.11); *H04N 21/44008* (2013.01); *H04N 21/8541* (2013.01)

(58) Field of Classification Search
CPC ........... G06T 11/60; G06T 7/207; G06T 7/97; H04N 19/583
See application file for complete search history.

(56) References Cited

U.S. PATENT DOCUMENTS

| | | | | |
|---|---|---|---|---|
| 2014/0359656 | A1* | 12/2014 | Banica | H04N 21/812 725/32 |
| 2016/0005201 | A1* | 1/2016 | Kunkel | H04N 9/67 345/589 |
| 2017/0083762 | A1* | 3/2017 | Segalovitz | G06K 9/00442 |

* cited by examiner

*Primary Examiner* — Nirav G Patel
(74) *Attorney, Agent, or Firm* — Kilpatrick Townsend & Stockton LLP

(57) ABSTRACT

The present disclosure relates to an apparatus, system and method for processing transmedia content data. More specifically, the disclosure provides for identifying and inserting one item of media content within another item of media content, e.g. inserting a video within a video, such that the first item of media content appears as part of the second item. The invention involves analysing a first visual media item to identify one or more spatial locations to insert the second visual media item within the image data of the first visual media item, detecting characteristics of the one or more identified spatial locations, transforming the second visual media item according to the detected characteristics and combining the first visual media item and second visual media item by inserting the transformed second visual media item into the first visual media item at the one or more identified spatial locations.

20 Claims, 13 Drawing Sheets

SYSTEM FOR OPTIMIZED EMBEDDING AND ANALYSIS OF BRANDED CONTENT

FIELD OF DISCLOSURE

The present disclosure relates to an apparatus, system and method for processing transmedia content data. More specifically, the disclosure provides for identifying and inserting one item of media content within another item of media content, e.g. inserting a video within a video, such that the first item of media content appears as part of the second item.

BACKGROUND

Influenced by a variety of different multimedia content types, new digital distribution channels, mobile communication devices and an ever increasing use of social media, industry is currently experiencing a disruption in how media is created, distributed and consumed. Classical production pipelines have become less effective as audiences move towards anytime, anywhere, personalized consumption, substituting TV-centric models with multi-device, multichannel models. Individual customers and groups of customers have also become more interactive and participatory, contributing significantly to the creation of new media. The cycles in the traditional creation-distribution-consumption loop become much shorter as consumers constantly provide feedback, resulting in a trend towards ultrashort form content.

Existing delivery platforms, for example YouTube and Facebook, allow for the creation and editing of simple channel based content, using a basic model whereby content creators can upload content such as video, text or images, and users can consume the content in an isolated, linear and mono-medial manner. This can often be done in conjunction with media presented via other platforms such as television or print media.

At the same time, functionality provided by existing multimedia platforms allows the sharing of user-generated content, which, along with social networking, is transforming the media ecosystem. Mobile phones, digital cameras and other pervasive devices produce huge amounts of data that users can continuously distribute in real time. Consequently, content sharing and distribution needs will continue to increase. The content can be of many different forms, known collectively as "transmedia" content.

Existing systems that allow users to generate, organize and share content are generally hard to control: these systems do not offer adequate tools for predicting what the next big trend will be, and which groupings of time-ordered content resonate with particular audiences. Furthermore, visualising the large amount of multimedia information in a way which users can explore and consume is challenging. In particular, visualisation of such large data sets is challenging in terms of performance, especially on lower-power devices such as smartphones or tablets. It is desirable that any visualisation of the data could be rendered in real time such that immediate visual feedback is provided to a user exploring the data.

The ever-growing availability of content to multiple users and the ever-increasing power of computing resources available to individual users is driving users towards their own individual creation of content, with such content being in multiple formats. This progression can be seen in FIG. 1. User 10 consumes single content items 15. With increasing computing resources, user 20 has developed into an interactive user making choices which affect the flow of individual content items 25 to the user 20. Further, user 30 has recently become more common by generating multiple personalised, individual content items 35 which can be accessed over the Internet 50 by other users. A problem now exists with a current user 40 who can access a considerable amount of different types of content items 35 over the Internet 50 and desires to utilise such content. It would be desirable for user 40 to be able to contribute to and generate new structured groups 46 of linked content items 45.

In utilising the content items 35, the amount of which can be considerable, it can be problematic for the user 40 to be able to readily identify relevant and appropriate content for placing into the new structured groups 46. Such content can additionally be identified by considering the content generated from other users. However, it can be equally problematic to identify the users who might be similar to user 40, and thereby themselves be generating relevant and appropriate content.

SUMMARY OF THE DISCLOSURE

According to a first aspect of the invention, a computer-implemented method is provided, the computer implemented method being for inserting a second visual media item into a first visual media item and visual media items being formed of image data. The method comprises analysing the first visual media item to identify one or more spatial locations to insert the second visual media item within the image data of the first visual media item, detecting characteristics of the one or more identified spatial locations within the first visual media item, transforming the second visual media item according to the detected characteristics, combining the first visual media item and second visual media item by inserting the transformed second visual media item into the first visual media item at the one or more identified spatial locations such that when the combined visual media item is output the second visual media item is displayed within the first media item at the one of more identified spatial locations.

Analysing the first visual media item to identify spatial locations may comprise searching for one or more of flat, homogeneous, and repetitive textured areas with the image data of the first visual media item using one or more of homographies, texture segmentation, colour segmentation, saliency mapping and machine learning techniques.

The method may further comprise analysing the identified spatial locations to determine one or more preferred spatial locations.

Detecting characteristics of the one or more identified spatial locations may comprise employing line detection, vanishing point computation, rectifying regular texture to determine spatial characteristics of the identified spatial location.

The first visual media item may be an image or a video. If the first visual media item is a video, the first visual media item comprises video frames.

The method may further comprise analysing the first visual media item to identify one or more temporal locations to insert the second visual media item within the image data of the first virtual media item.

The first and second visual media items may be combined such that when the combined visual media item is output, the second visual media item is displayed within the first media item at the one or more identified spatial locations and the one or more temporal locations.

Identifying one or more temporal locations may comprise analysing the image data of the first visual media item to detect shot transitions.

Determining the characteristics of the identified spatial locations may comprise determining the characteristics of the identified spatial locations at the identified temporal locations by measuring of the stability of tracking in the image data of the first visual media item. The stability of tracking may be measured by KLT tracking, SfM or improved tracking for planes.

Determining the characteristics of the identified spatial locations may comprise analysing motion of the spatial location within the image data of multiple video frames across the temporal location to determine the 3-dimensional structure of the spatial location.

The method may further comprise selecting the second visual media item from a collection of candidate visual media items.

Selection of the second visual media item may be based on one or more of: an analysis of colour and lighting in the first visual media item at the identified spatial location and each candidate visual media item.

Alternatively or additionally, selection of the second visual media item may be based on a comparison of at least two of: metadata of the first visual media item, metadata of each candidate visual media item and user preference data.

The second visual media item may be an image or a video.

In a second aspect of the invention, a computer-readable medium containing computer readable instructions is provided. When the computer readable instructions are executed by processing circuitry, the processing circuitry performs the steps of the method set out above.

In a third aspect of the invention, an electronic device is provided, the electronic device comprising a memory and processing circuitry. The processing circuitry is configured to perform the steps of the method set out above.

BRIEF DESCRIPTION OF DRAWINGS

The present invention is described in exemplary embodiments below with reference to the accompanying drawings in which.

DETAILED DISCLOSURE

Figure 1:
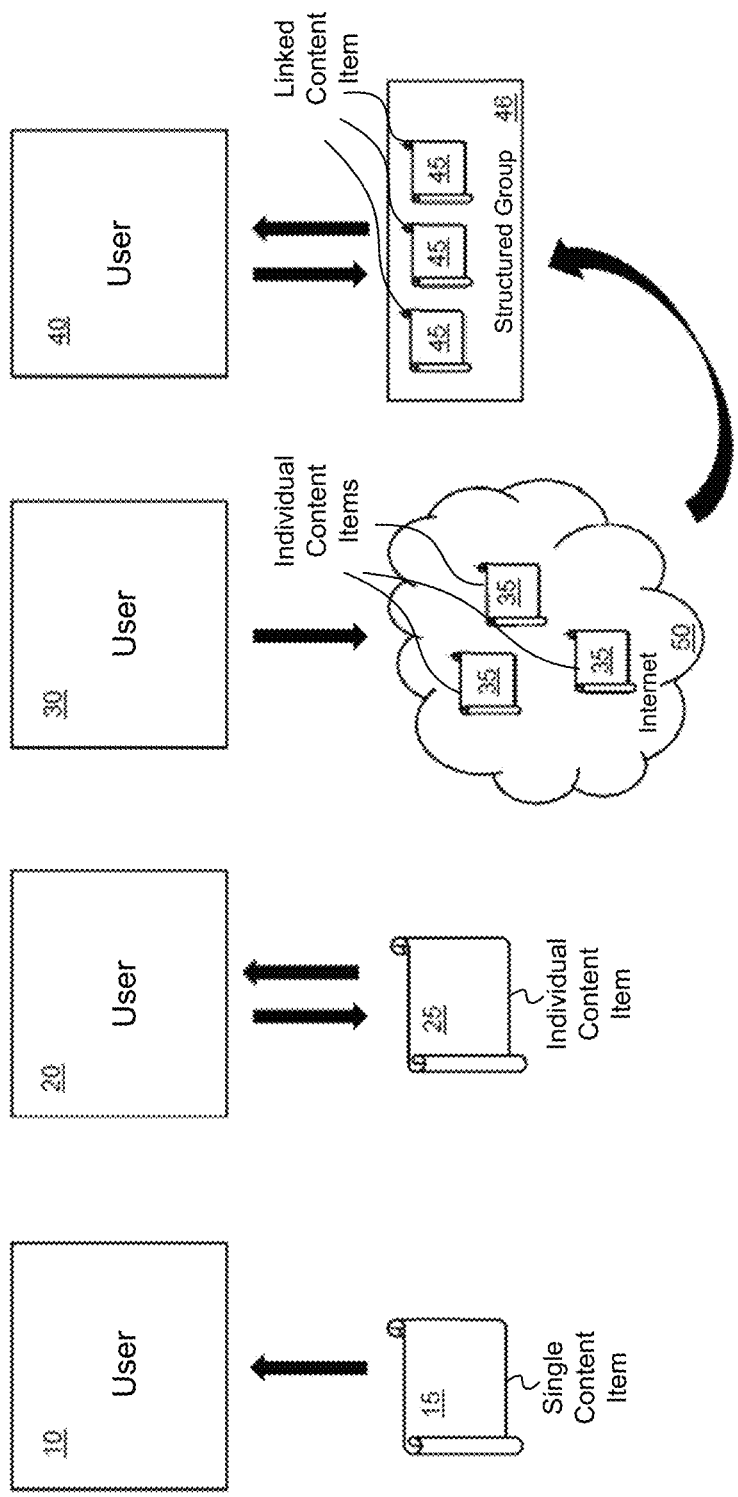
FIG. 1 depicts how users interact with content items according to the present disclosure.

The present disclosure describes a new apparatus, system and method for managing transmedia content. In one embodiment, there is disclosed a platform for the creation, distribution and consumption of transmedia content. The content may be arranged in a time-ordered manner for consumption, thereby defining so-called "story" based content.

In the context of the present disclosure, groups of time-ordered content, for example in the form of stories, are made up of multiple elements of transmedia content, each being referred to herein as a transmedia content data items. Each item pertains to a narrative element of the story. Each transmedia content data item may be linked, and thus connected, to one or more other transmedia content data items in an ordered fashion such that a user can navigate through subsets of the transmedia content data items (also referred to as transmedia content subsets) in a time-ordered fashion to consume some or all of an entire story.

The term "transmedia" means that the grouped content data items (which are linked within the content subsets) comprise a plurality of different multimedia types, e.g. at least two different types of multimedia content. For example, the different types of transmedia content data of each content data item within the subset can comprise at least two different types from one or more of the following: textual data, image data, video data, audio data, animation data, graphical visualization or UI data, hypertext data, gaming data, interactive experience data, virtual reality (VR) data, augmented reality data, and multisensory experience data. Each transmedia content data item may itself comprise multiple media types, e.g. video and audio data may be present within a single item such that the audio is time-associated associated with the video.

The transmedia content data items can be grouped into transmedia content subsets. Each subset may be grouped based on one or more non-linear network of the content data items.

Within each transmedia content subset, transmedia content data items are linked to one another, directly or indirectly, by time-ordered links between each data item. Typically; each time ordered-content link links two transmedia content data items. An exception exists for a time ordered link which connects a subset entry point and a transmedia content data item as explained below. The time-ordered link also defines a direction between the two transmedia content data items. The direction indicates an order in which linked transmedia content data items should be presented to a user of the system. For example; when a first transmedia content data item is presented to a user, at least one outgoing time-ordered link (i.e. the direction defined by the link is away from the first transmedia content data item) indicates a second transmedia content item that should be presented to the user next.

The term "subset" is used to denote a subset of transmedia content data items within the set of all transmedia content data items stored by the system. The transmedia content data items that are part of a transmedia content subset are all directly or indirectly connected to each via time-ordered content links between the transmedia content data items. A transmedia content subset may be a linear, i.e. each transmedia content data item in the subset has at most one incoming time-ordered content link and one outgoing time-ordered content link, or a non-linear network, i.e. one or more of the constituent transmedia content data items has more than one incoming or outgoing time-ordered content link. It will also be appreciated a non-linear network of transmedia content data items can be considered to be made up of multiple overlapping linear paths from start-point to end-point through that network, and that each linear path may also be considered to be a transmedia content subset. Furthermore, the term "group" has been used to denote a collection of transmedia content data items that are not necessarily connected, directly or indirectly, via time-ordered content links. However, where the term "group" has been used, a "subset" of transmedia content data items; as defined above, may additionally be formed and utilised.

Each time-ordered link is stored in memory as link data comprising: the input content data item; and the output content data item and thus implicitly a direction between two content data items. Directional data for the links is also stored which defines the path the links should be processed, and thus the order for processing of transmedia content items. The order can also be dependent on user interaction with each item as it is surfaced to a user.

Figure 2C:
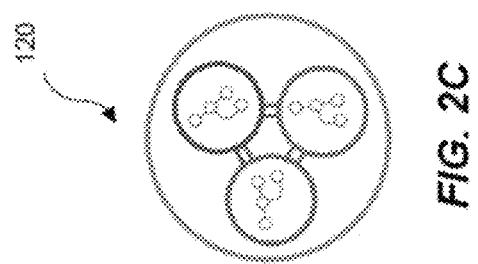
FIGS. 2A, 2B and 2C depict a linear transmedia content subset, grouped non-linear transmedia content subsets, and a subset universe respectively, each formed of multiple transmedia content data items and time-ordered content links.
Figure 2B:
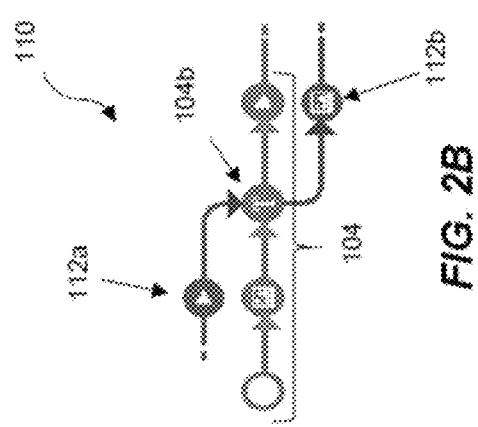
Figure 2A:
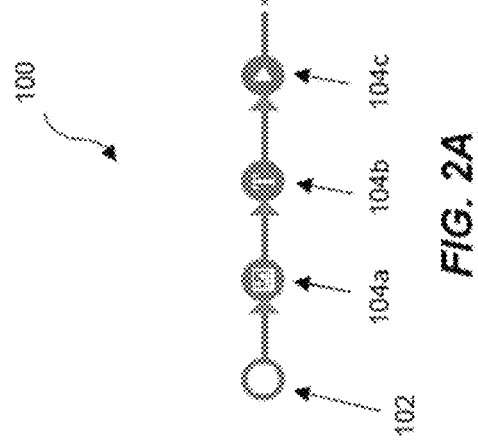

Examples of transmedia content subsets are depicted in FIGS. 2A, 2B and 2C. As mentioned above, the transmedia content data items are grouped into transmedia content subsets.

In FIG. 2A, subset 100 defines a linear path of transmedia content data items 104a-c. The subset 100 also comprises a subset entry point 102, which defines a starting point in the subset from which the system can commence presenting the transmedia content data items within the subset. The subset entry point 102 may be linked to the first transmedia content data item 104a by a time-ordered link, or may be a flag associated with the first transmedia content data item 104a which indicates that the transmedia content data item 104a is the first in the subset.

In the context of the present disclosure, the term "linear" means that each transmedia content data item has, at most, only one incoming time-ordered line (i.e. the direction defined by the link is inwards towards the transmedia content data item) and only one outgoing time-ordered link. The path defined by the transmedia content subset 100 is unidirectional and there is only one possible route from the subset entry point 102 and the final transmedia content data item of the path (i.e. a transmedia content data item with an incoming time-ordered link but no outgoing time ordered link).

The transmedia content data items may also be grouped based on multiple content subsets in a non-linear network, such as non-linear network 110 depicted in FIG. 2B. In this context, the term "non-linear" means that time-ordered links between the data items of each network may form a plurality of different paths through the network 110 which start in different places, end in different places, branch, split, diverge, leave some data items out of the path or overlap with other paths. Such a non-linear network 110 can also be considered to be a group of transmedia content subsets which share one or more transmedia content data items, time-ordered content links, or both transmedia content data items and time-ordered content links.

In the depicted non-linear network 110, each transmedia content data item 104a-c, 112a-b can have one or more incoming time-ordered links and one or more outgoing time-ordered links. The data items 112a, 104b and 112b form a second transmedia content subset which shares the data item 104b with the first transmedia content subset 100.

FIG. 2C depicts a story universe 120, in which multiple, related non-linear networks are grouped or clustered together. In one embodiment, the non-linear networks of a story universe do not share transmedia content data items, time-ordered links, or both transmedia content data items and time-ordered links with the non-linear networks of another, different story universe. However, in an alternative embodiment, the non-linear networks of a story universe do share one or more transmedia content data items, time-ordered links, or both transmedia content data items and time-ordered content links with the non-linear networks of another, different story universe.

The system of the present disclosure manages the transmedia content data items, transmedia content subsets and one or more non-linear networks, facilitates the generation and manipulation of items between and within subsets and networks so that storylines can be formed. Accordingly, the creation of transmedia content subsets and non-linear networks by a user of the system enables collaboration between users of the system and allows consumption of the created storylines. The architecture of the system is depicted in FIG. 3.

Figure 3:
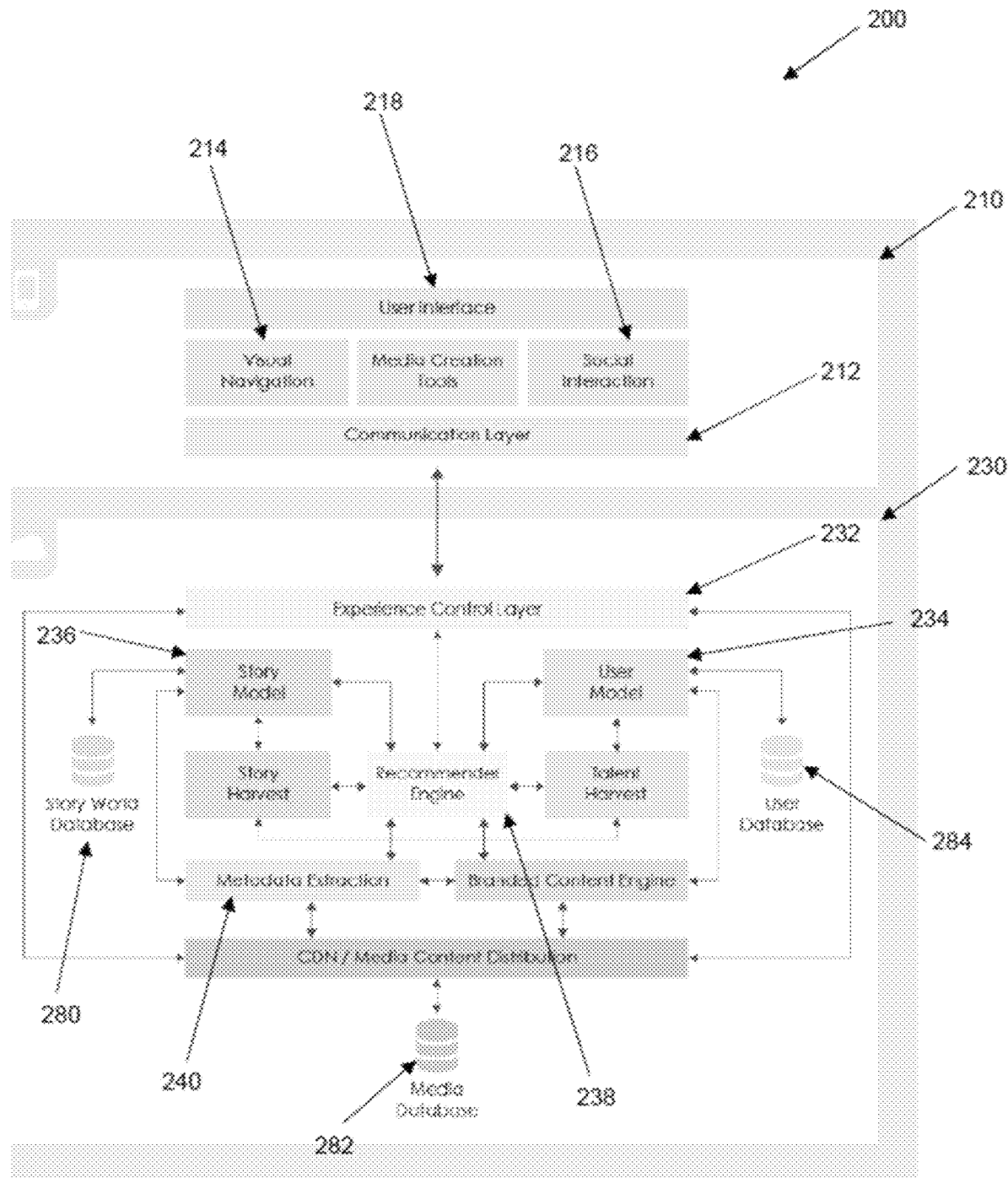
FIG. 3 depicts the architecture of the system of the present disclosure.

FIG. 3 depicts the overall architecture of the system 200. The system 200 includes a frontend device 210, which is typically located on a user device such as a smartphone, tablet or PC that is operated directly by the user of the system 200, and a backend device 230, which is typically located on one or more servers that are connected to the user device via a network such as the Internet.

The backend 230 contains global resources and processes that are managed, stored and executed at a central location or several distributed locations. The frontend 210 contains resources and processes that are stored and executed on an individual user device. The backend 230 is responsible for tasks that operate on large amounts of data and across multiple users and stories, while the frontend 210 only has access to the resources of a particular user (or a group of users) and focuses on presentation and interaction.

The frontend 210 communicates with the backend 230 via the network, the communication layer 212 that is part of the frontend 210 and the experience control layer 232 that is part of the backend 230. The experience control layer 232 is responsible for handling the distribution of transmedia content data items, access limitations, security and privacy aspects, handling of inappropriate content data items, and user-specific limitations such as age group restrictions. It ensures that inappropriate, illegal, unlicensed or IP-violating content is flagged, removed, or flagged and removed, either automatically, semi-automatically or manually. It also handles sessions as the user interacts with the system and provides session specific contextual information, including the user's geolocation, consumption environment and consumption device, which can then be used by the frontend 210 to adapt the consumption experience accordingly. The experience control layer 232 also acts as a checkpoint for content validation, story verification, and story logic, in order to provide users with a consistent story experience.

The communication layer 212 performs client-side checks on permissions, content validation, and session management. While the final checks happen at the experience control layer 232 of the backend 230, the additional checks carried out in the communication layer 212 help in providing a consistent experience to the user (e.g. not displaying content or features that cannot be accessed).

The frontend 210 also includes the user interface (UI) component 220, which is responsible for displaying and presenting the transmedia content data items to users, including visual, auditory and textual representations, and is also responsible for receiving the user's input through pointing devices, touch events, text input devices, audio commands, live video, or any other kind of interaction. The UI component 218 can adapt to the user's location, environment, or current user state in order to provide an optimized experience.

The visual navigation component 214 is also included in the frontend 210, and allows a user to explore, browse, filter and search the transmedia content data items, transmedia content subsets and non-linear networks, and any other content provided by the platform. For navigation in the context of transmedia content and stories, the visual navigation component 214 provides intelligent abstractions and higher-level clusterings of transmedia content data items, transmedia content subsets and non-linear networks, providing the user with an interface for interactive visual exploration of the transmedia content, which enables the user to make navigation choices at a higher-level abstraction before exploring lower levels, down to single stories, i.e. transmedia content subsets, and individual transmedia content data items. The structure of transmedia content subsets and non-linear network and the time-ordered links between transmedia content data items data items is visualized as well, providing the user with information on how these data items are related to each other. In one embodiment of this visualisation, a graph structure is employed, with nodes representing transmedia content data items, and connections representing the time-ordered content links. In the main, the evolution of the transmedia content subsets and non-linear networks is rendered in real-time as the subsets and non-linear networks are created and modified by all users of the system. In addition, in a particular embodiment which is user initiated, for example via user selection or automatically based on user interaction, e.g. immediately or shortly after a given user logs in to the system, the recent past evolution of the transmedia content subsets and non-linear networks, e.g. the evolution since last login of the given user can be displayed graphically, e.g. in a time lapse rendering of the changes of the transmedia content subsets and non-linear networks in the order in which they occurred.

The social interaction component 216 handles visualisations and user input related to interactions between individual users of the system 200. It provides tools for editing a user's public information, enabling notifications on other users creating content (following), endorsing and rating other users' content, and directly interacting with other users through real-time messaging systems, discussion boards, and video conferencing. These tools also allow users to collaboratively create new content (i.e. transmedia content data items) and author and edit stories (i.e. transmedia content subsets, non-linear networks, or both transmedia content subsets and non-linear networks), as well as define the access rights and permissions associated with such collaborative work. The enforcement of these rights is handled by the experience control layer 232, as mentioned above.

In addition to the experience control layer 232, the backend 230 comprises a user model component 234, a story model component 236, a recommender engine 238, and a metadata extraction component 240, in addition to one or more data stores or computer memory for storing data related to the transmedia content such as the transmedia content data items, linking data, transmedia content subsets, non-linear networks, and metadata relating to the individual data items and linking data as well as to the subsets and non-linear networks.

The user model component 234 represents user behaviour and properties. It is driven by a suite of algorithms and data collections, including but not limited to statistics, analytics and machine learning algorithms operating on user interaction patterns, consumption behaviour and social interactions. The analytics happens in real-time and the user model component 234 is continuously updated as the user interacts with the system 200. Additional information such as the user's geolocation can be taken into account as well. The corresponding data is stored in a user database. The user model component 234 also comprises models for groups of several users, which for example emerge during multiuser collaboration, consumption, geolocation, or social interactions. As part of the user model component 234, users, groups of users, or both users and groups of users are profiled and characterized according to their personality, productivity stage and other criteria. The user model component allows the system to make predictions of user behaviour under real or hypothetical conditions, which then feed into the recommender engine component 238. The methods employed by the user model component for prediction user behaviour and creative state are described below in more detail with respect to FIG. 9. The user model component 234 also permits the correlation of interaction patterns of users not identified to the system so as to re-identify users probabilistically.

The user model component 234 is also connected to the talent harvest component, which, based on user behaviour, identifies individual users or groups of users that fulfil certain criteria such as, for example, having a large amount of users consuming or endorsing their work, having significant influence on other users' behaviours and opinions, or being highly popular personalities. The talent harvest component, in concert with the recommender engine component 238, then influences the behaviour of such users of the system 200.

The story model component 236 characterises the content of single transmedia content data items, transmedia content subsets, non-linear networks and whole story universe, and stores the corresponding data in a story world database. The characterisations are found through algorithms such as, but not limited to, metadata extraction, analytics, graph analysis, or any other algorithms operating on connections between content in general. Metadata extraction extends to include visual, auditory or textual elements, as well as higher-level concepts like characters, character personality traits, actions, settings, and environments. The characterisation also takes into account how users interact with the content, including the analysis of consumption patterns, content ratings and content-related social interaction behaviour. The corresponding updates of the story model component 236 happen in real-time as users interact with the system 200 or as new content is created or existing content is modified. Additionally, the story model component 236 makes use of story, characterisations (including metadata) to model story logic. Using story reasoning, the consistency of individual stories can be verified and logical inconsistencies can be prevented either when a story is created or at the time of consumption. The story model component 236 also communication with the story harvest component, which uses the data provided by the story model component 236 in order to identify and extract content (transmedia media content data items, transmedia content subsets, non-linear networks or higher-level abstractions).

The recommender engine component 238 is in communication with both the story model component 236 and the user model component 234 and provides conceptual connections between the story model component 236 and the user model component 234. The recommender engine component 238 uses data analytics to match content (transmedia content data items, transmedia content subsets, non-linear networks) with users, suggesting users for collaboration, suggesting content to be consumed, or suggesting stories, story arcs or story systems to be extended with new content. Recommendations can be explicit, with recommendations being explicitly labelled as such to the user, guiding the user through a transmedia content subset or non-linear by providing an optimal consumption path or suggesting other users to collaborate with, or they can be implicit, meaning the user's choice is biased towards certain elements of content (including transmedia content, advertisement, users), without making the bias explicitly visible to the user.

The metadata extraction component extracts metadata from transmedia content (i.e. one or more of transmedia content data items, transmedia content subsets, and non-linear networks) automatically, semi-automatically, or manually. The metadata extraction component 240 tags and annotates transmedia content, providing a semantic abstraction not only of the content of individual transmedia content data items, but also of the time-ordered links, transmedia content subsets, non-linear networks, and story systems. The derived metadata thus spans a horizontal dimension (cross-domain, covering different types of media) as well as a vertical one (from single transmedia content data items to whole story systems).

Also depicted in FIG. 3 are story world database 280, media (content) database 282 and user database 284. The databases 280-284 are stored in memory 301 of server device 230. The story world database 280 stores data characterising and defining the structure of the transmedia content subsets, non-linear networks and whole story systems, for example by way of linking data defining the subset structure. Additionally, metadata and graph analytics pertaining to the subsets and networks may also be stored in the story world database 280. The media database 282 stores individual content items, and data characterising the content of individual transmedia content data items, e.g. metadata and graph analytics for the individual content items. The user database 284 stores user data pertaining to users of the system 200, including user behaviour data defining how users have interacted with individual content items and subsets, and user preference data defining user indicated or derived preferences for content items and subsets.

Figure 4:
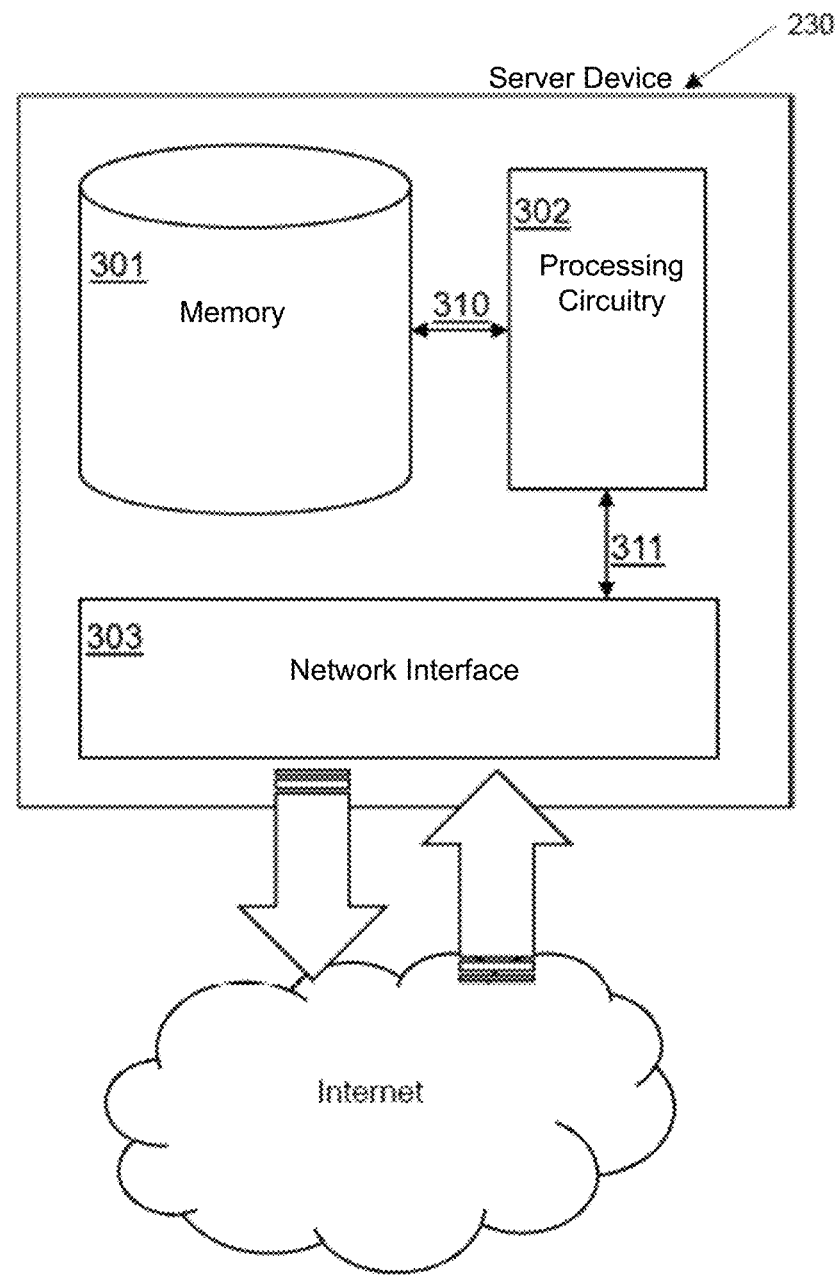
FIG. 4 depicts an exemplary apparatus on which the backend of the present disclosure operates.

FIG. 4 depicts an exemplary backend server device 230 on which the backend of the system 200 is implemented. It will be appreciated that the backend 230 or functional components thereof may be implemented across several servers or other devices. The server device 230 includes the memory 301, processing circuitry 302 and a network interface 303. The memory may be any combination of one or more databases, other long-term storage such as a hard disk drive or solid state drive, or RAM. As described above, the memory 301 stores the transmedia content data items and associated linking data, which define time-ordered content links between the plurality of transmedia content data items. The plurality of transmedia content data items are arranged into linked transmedia content subsets comprising different groups of the transmedia content data items and different content links therebetween. The processing circuitry 302 is in communication with the memory 301 and is configured to receive instructions from a user device via the network interface to create new time-ordered content links between at least two of the plurality of transmedia content data items and modify 301 the linking data stored in the memory to include the new time-ordered content link.

Figure 5:
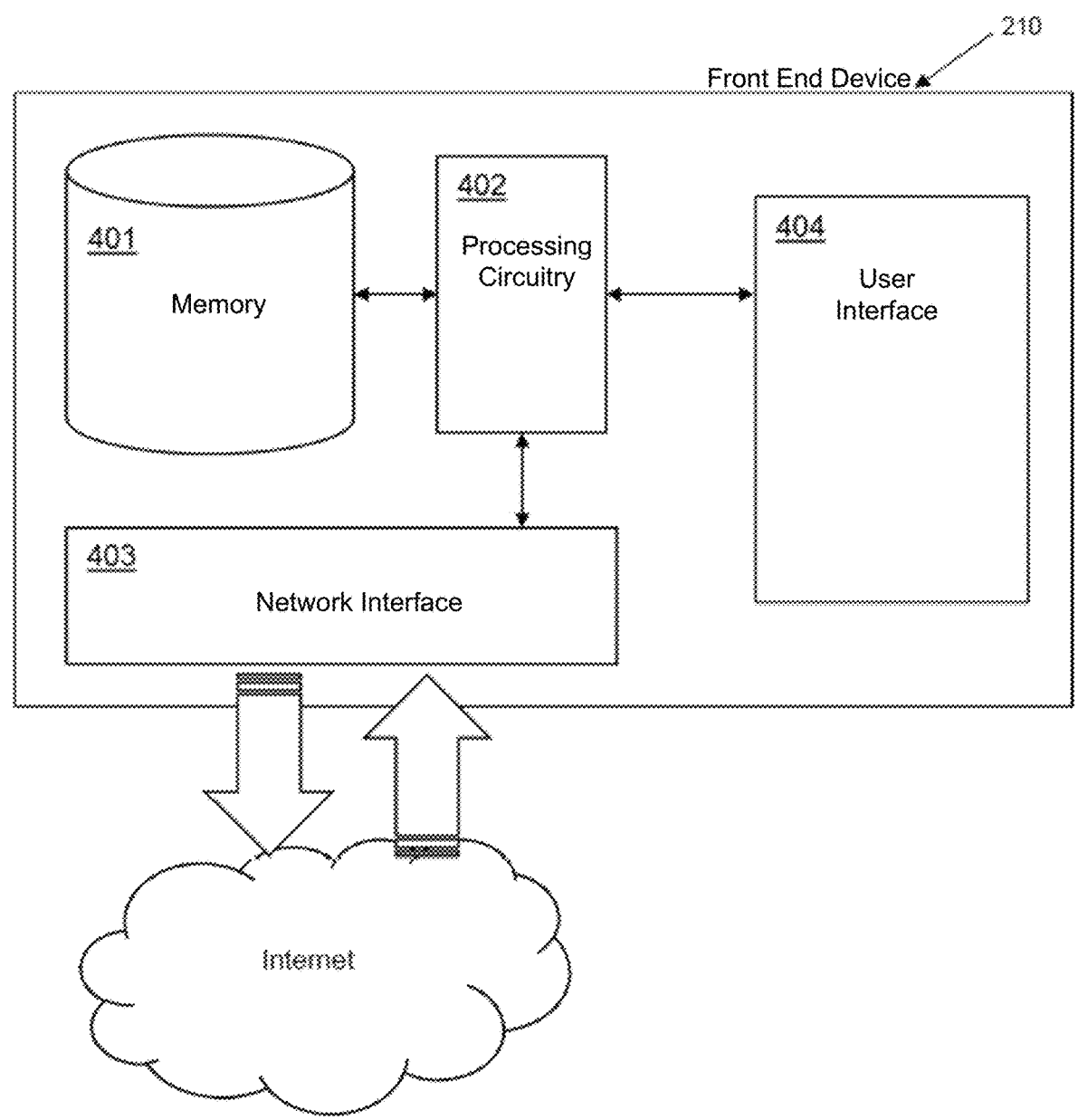
FIG. 5 depicts an exemplary apparatus on which the frontend of the present disclosure operates.

FIG. 5 depicts an exemplary frontend electronic user device 210 on which the frontend of system 200 is provisioned. The user device 210 includes a memory 401, processing circuitry 402, network interface 403 and a user interface 404. The user interface 404 may comprise one or more of: a touch-sensitive input, such as a touch-sensitive display, a touchscreen, pointing device, keyboard, display device, audio output device, and a tablet/stylus. The network interface 403 may be in wired or wireless communication with a network such as the Internet and, ultimately, the server device 230 depicted in FIG. 4. The electronic device 210 receives user input at the user interface 404 and thereby communicates with the server device 230 via the network interface 403 and network interface 303, which provides the processor 302 with instructions to create new time-ordered content links between the transmedia content data items in the memory 301. The electronic device 210 may also provide instructions to the server device 230 to delete or modify existing time-ordered content links, transmedia content data items, or both time-ordered links and transmedia content data items from the memory.

It will be appreciated that the system may comprise multiple frontend electronic devices 210, each configured to receive user input and thereby communicate with the server device 230 and provide instructions to create, delete or modify time-ordered content links between the transmedia content data items. Thus, multiple electronic devices 210, each being accessed by a different user, are adapted to process common content links and content data items which are accessible to multiple users.

The memory 301 of the server device 230 may also store user data items, which are associated with users of the system 200 and comprise one or more of: user identification data, such as a username, password, email address, telephone number and other profile information. The user data items may also comprise, for each user of the system one or more of: user preference data pertaining to each user's preferences, user behaviour data pertaining to the each user's online behaviours, user interaction data pertaining to the each user's interaction with other users, user location data pertaining to the current determined and user location data pertaining to a past determined location of the each user.

The server device 230 may also be configured to implement the user model 234 of the system 200 as mentioned above as described below in further detail with respect to FIG. 9. The processing circuitry 302 of the device 230 can use the user model 234 to identify user interactions of the users of the system 200 with the transmedia content data items and subsequently update the user interaction data stored in the memory 301 in accordance with the user interaction.

The memory 301 may also store content characterisation data items, which characterise one or more of the transmedia content data items. In particular, the memory 301 may store one or more of: auditory characterisation data which characterises auditory components the transmedia content data items, visual characterisation data which characterises visual components of the transmedia content data items, textual characterisation data which characterises textual components of the transmedia content data items and interaction characterisation data which characterises interactive components, such as games, or quizzes, or puzzles, of the one or more transmedia content data items. The processing circuitry 303 of the server device 230 can be further configured to provide a content subset modelling engine that processes the content characterisation data items for each transmedia content data item in a given transmedia content subset and generates unique subset characterisation data for the transmedia content subset based on the processed characterisation data. The content subset modelling engine may be provided by the story model component 236 mentioned above.

The processing circuitry 302 may also implement the transmedia content recommender engine 238, mentioned above and described below in more detail with respect to FIG. 7. The recommender engine 238 is configured to process the characterisation data items and the user data items for a given user and identify transmedia content data items and surface identification(s) of one or more of the transmedia content data items that are predicted to be matched to users, and additionally can surface identification(s) of other matched users of the system 200.

The processing circuitry 302 of the server device is also configured to implement the experience control layer 232 mentioned above. The experience control layer 232 implements a permission control system which is used to determine whether a given user has permission to view, edit, modify or delete a given transmedia content data item, time-ordered content like, transmedia content subset or non-linear network. Collaboration is a challenge in itself; however, authorship attribution and consistency in particular are supported. A balance is then provided between a very rigid and tight permission system, which might hinder collaboration and discourage potential contributors from sharing their ideas, and an open system which allows any user to modify or delete the content contributed by other users.

For a given transmedia content subset or non-linear network, created by an original first user (referenced hereinafter as "Alice"), and which consists of individual transmedia content data items connected by time-ordered content links therebetween, this transmedia content subset or non-linear network is attributed to and owned by Alice in metadata associated with at least one of the transmedia content data items, linking data and the original transmedia content subset and non-linear network exclusively. The experience control layer 232 only allows modifications to the original transmedia content subset or non-linear network by Alice. The system 200 is also configured such that a system administrator user or moderator user can provide or change permissions for and between all individual users, regardless of permissions assigned by individual users.

A second user (referenced hereinafter as "Bob") may wish to contribute to the transmedia content subset or non-linear network. Bob may wish to insert a new transmedia content data item into the transmedia content subset or non-linear network, or Bob may wish to create new linking data that defines an alternative path through the non-linear network or transmedia content subset.

The experience control layer 232 does not permit Bob to modify the original transmedia content subset or non-linear network that are attributed to and owned by Alice in the metadata. Instead, the experience control layer 232 instructs the processor 302 to create a copy of the original transmedia content subset or non-linear network in the memory 301, which includes the changes to the transmedia content data items or linking data input by Bob.

The copy will be exclusively owned by Bob in the metadata associated with the copied transmedia content subset or non-linear network, and as such the experience control layer 232 will permit only Bob to edit or modify the copied transmedia content subset or non-linear network. However, the original transmedia content data items and linking data contributed by Alice remain attributed to Alice in the metadata, and only the new transmedia content data items and linking data are attributed to Bob in the metadata. The copied transmedia content subset or non-linear network maintains a reference to the original transmedia content subset or non-linear network.

As Bob interacts with the content by creating, modifying and editing content items, subsets and non-linear networks, it updates in real time such that all other users can see the changes as they happen, including Alice.

In an alternative embodiment, Bob can interact with the content by creating, modifying and editing content items, subsets and non-linear networks so that the changes at this stage can only be seen by Bob. When Bob is finished and no longer wishes to modify the content, subsets or non-linear networks, he can formally submit his changes and the experience control layer 232 provides the copied transmedia content subset or non-linear network to the user, more particularly to the user device of the user that is indicated by the metadata of the original transmedia content subset or non-linear network as the owner, e.g. Alice's user device, for review. Alice may then choose to "merge" the copied transmedia content subset or non-linear network with the original. The experience control layer 232 will delete the original and modify the metadata of the copy to indicate that Alice is owner of the copied transmedia content subset or non-linear network, since Bob will have previously been designated in the metadata as owner of any items, subsets or networks which were created or modified by him. The metadata of the individual transmedia content items and linking data, other than the owner, is left unchanged.

Alice may approve of the modifications made by Bob, but may wish keep the modifications as an optional alternative. In this case, she will choose to "branch" the original transmedia content subset or non-linear network. The experience control layer 232 will modify the original transmedia content subset or non-linear network to include any new transmedia content data items and linking data contributed by Bob. The metadata of the individual transmedia content items and linking data is unchanged, and the metadata for the modified original transmedia content subset or non-linear network still identifies Alice as the owner.

Finally, Alice may disapprove of the modification made by Bob, and can choose to "push out" Bob's version. This causes the experience control layer 232 to remove the reference link from the copy to the original. Again, the metadata of the individual transmedia content items and linking data is unchanged. This means that Bob's version of the content items, subset and non-linear networks as a result of his creation or modifications are now distinct from Alice's, and exists separately in memory with corresponding metadata to indicate that he is the owner of this version.

The system 200 and experience control layer 232 may allow Alice to fully delete Bob's edit, or force the modification to be hidden from other users of the system. Allowing for this option might be required in some cases, for example when copyright is infringed or the content contributed by Bob is inappropriate.

As mentioned above, the system 200 structures groups of content subsets ("storyworlds"), i.e. non-linear networks, as directed graphs of connected transmedia story data items and storylines, i.e. transmedia content subsets, as sequences of connected transmedia content data items out of the generated non-linear networks graphs.

Figure 6:
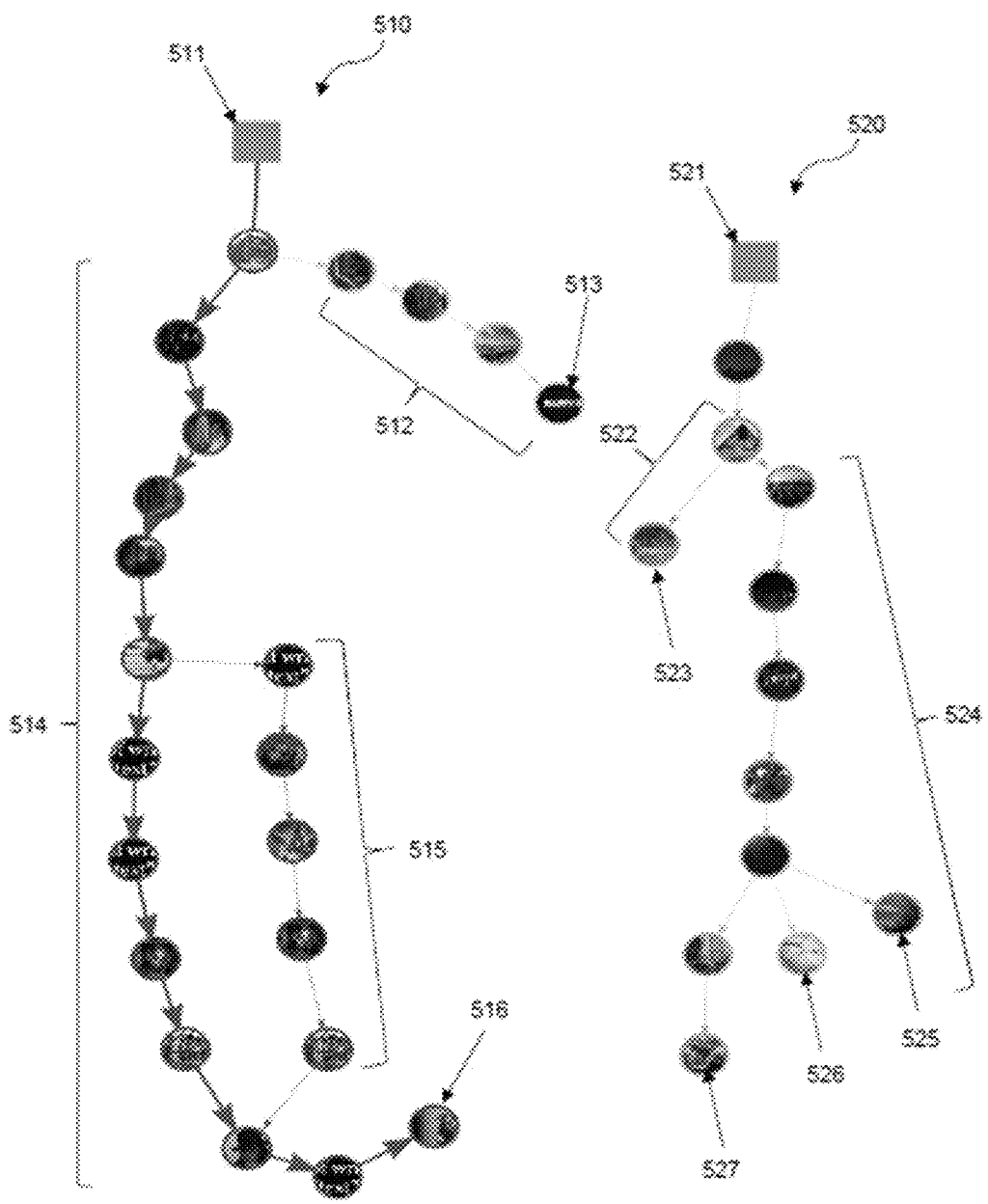
FIG. 6 depicts exemplary non-linear networks of transmedia content data items according to the present disclosure.

The story model component 236 of the system 200 arranges the stories and storyworlds at the transmedia content level based on complex graph metrics. The transmedia content data items are nodes. Edges of the graph define the time-ordered content links between transmedia content data items. The edges and nodes of the graph may be assigned with weights derived from story attributes, e.g. number of likes received by users consuming the story. The graph-based model defines all of the possible consumption flows throughout a given graph and allows identification of transmedia content data items which play key roles within the storyworld. FIG. 6 depicts a graph-model of two non-linear networks of transmedia content data items.

Each depicted non-linear network, 510 and 520 includes at least two subset entry points 511 and 521 which define starting points in the subset (and also any non-linear networks that the subsets are part of) from which the system should begin presenting the transmedia content data items. Non-linear network 511 has two distinct end points 513, 516, which are transmedia content data items that have only incoming time-ordered content links. End point 513 is preceded by a branch 512 of the non-linear network, which shares only its first data item in common with a second brand 514. Branch 514 has an alternate path 515 which skips several of the transmedia content data items of the rest of the branch and then re-joins the branch 515 to terminate at the end point 516. In contrast, non-linear network 520 has four branches with four distinct end points 523, 525, 526 and 527, which share varying numbers of transmedia content data items in common with one another. The data thus generated and stored which is representative of the non-linear network is structural data indicative of the nodes and edges and links therebetween, thereby defining the time-ordered structure of content data items in for the non-linear network.

In a hierarchical system containing a lot of changing content at different levels (story systems, non-linear networks, transmedia content subsets and individual transmedia content data items) users can easily get lost in irrelevant content (for the user) or unappealing content (for the user). An engine guiding the user and fostering the creation of high quality content is thus provided.

As mentioned above, the system 200 further includes a recommender engine component 238 in the backend device 230, which principally provides one or both of two functions namely: (i) surface relevant transmedia content data items, whether as individual items, or as linked content subsets to a given users of the system; and (ii) surface relevant users and their content to the given user. References herein to the "given" user mean a user who is logged into the system 200 via their frontend device 210 and is accessing data, including content items and user data from the backend device 230.

Figure 7:
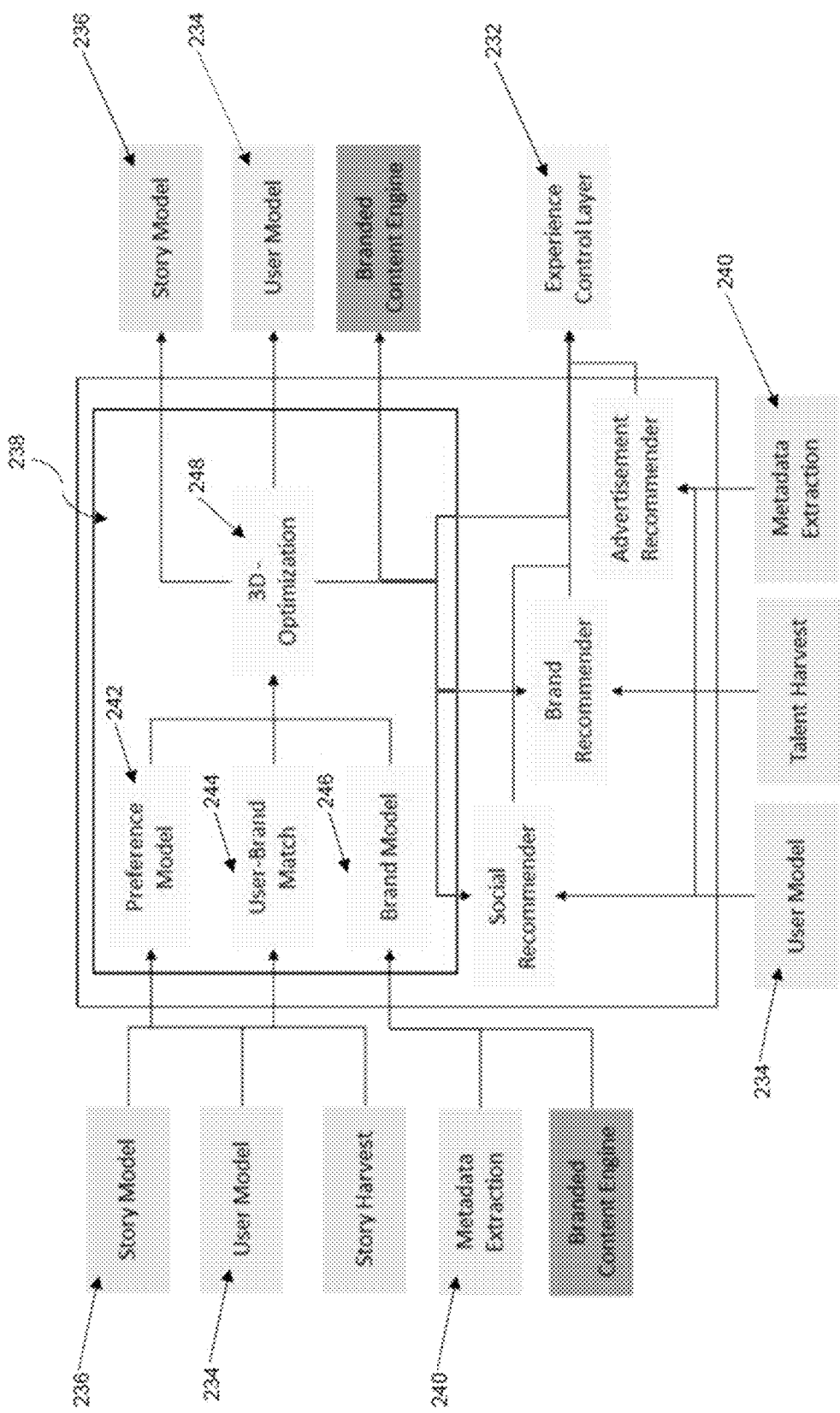
FIG. 7 depicts a recommender engine of the apparatus of the present disclosure.

FIG. 7 shows data flows between some components of the backend device 230, in particular, the inputs and outputs of the recommender engine component 234 implemented in the backend device 230.

As mentioned above, the recommender engine component 238 permits users via the frontend device 210 to receive suggestions about possible story elements, i.e. transmedia content data items, to be consumed or extended with new content by the given user. Due to the hierarchic nature of the system, recommendations can be issued at one or more different levels of granularity, e.g. story system, non-linear networks, transmedia content subsets and individual transmedia content data items. Furthermore, recommendations are dynamic, i.e. they change with continuously evolving content. Recommendations also take into account preferences of the given user to keep the user engaged with processing the time-arranged content items. This can mean that individual content items from the same or other users with sufficiently similar or identical content characteristic metadata, e.g. specifying content with sufficiently similar characters, occurring at sufficiently similar or identical factual or fictional times, or in sufficiently similar or identical factual or fictional times, as the characteristic metadata of the content which has already been utilised (consumed) by the user can be surfaced by the recommender engine component 238.

In general terms, the recommender engine component 238 is configured to access the memory 301 of the backend device 230 and surface one or more identifications of individual content items, linked transmedia content subsets, or both identifications of individual content items and linked transmedia content subsets to a given user of the system. This is achieved with the identifications of such content being passed to experience control layer 232, as can be seen in FIG. 3 and FIG. 7. In addition, the recommender engine component 238 can be configured to surface users relevant to the given user with one or more identifications of other recommended users being passed to the experience control layer 232. The experience control layer 232 obtains the received identifications and passes them to frontend device 210 for display in the user interface 218 via the visual navigation component 214.

The surfaced content items or linked transmedia content subsets are selected by the recommender engine component 238 based on data about the individual transmedia content data items and transmedia content subsets already stored in the memory 301. In the present context, "surface" means that the selected one or more items of content or users are isolated from other items of content or users and provided as one or more identifications to the given user, e.g, as a notification on the user device, or as a special flag associated with the surfaced item. This way, the given user can readily access the content and information and content associated with other users.

The recommender engine component 238 includes a preference model 242, the function of which is to provide a score of a given transmedia content data item or transmedia content subset for a specific user of the system 200. The preference model 242 is depicted in FIG. 8.

Figure 8:
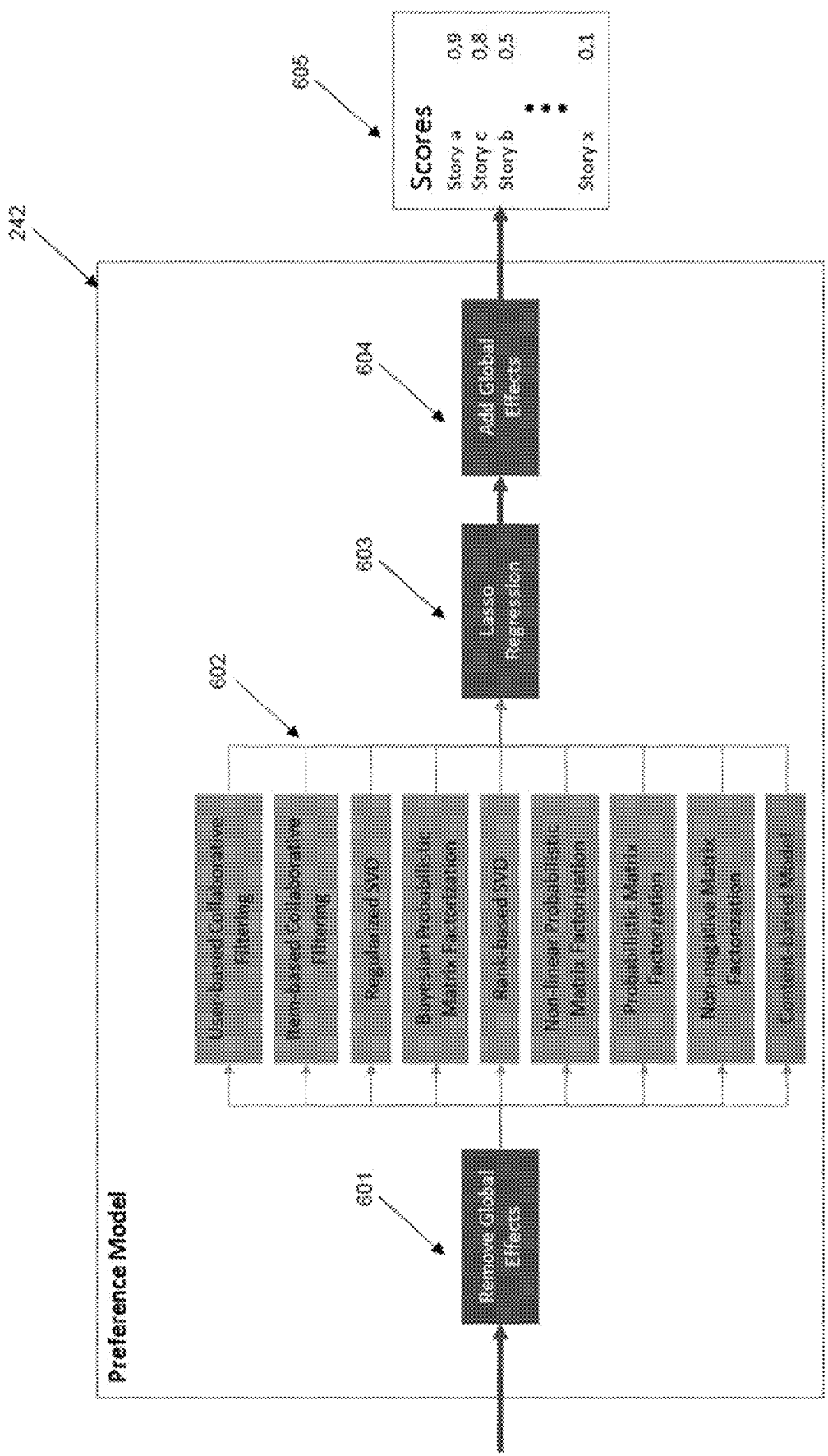
FIG. 8 depicts an exemplary preference model component of the recommender engine component according to the present disclosure.

Referring to FIG. 8, the preference model 242 takes as input, data about one or more transmedia content data items or transmedia content subsets and provides as output to an optimisation component 248 a score for each input item for a given user. The preference model 242 achieves this by, at a first step 601, removing global effects. Some users might, for example, tend to constantly give lower ratings (user-assigned scores) than others. Removing this bias before processing the input items improves prediction accuracy. In a second step 602, the model collects the predictions of n independent state of the art algorithms (such as Rank-based SVD). The system then builds an ensemble prediction at step 603 by using a Lasso Regression. In the last step 604, the global effects are added back to the ensemble prediction to obtain and output a final suitability score 605 of all input content and users in respect of the given user.

The recommender engine component 238 may also include a user-brand match component 244, which is configured to provide, for the given user, at least one prediction of a preference for a given branded content data item, and a branded content model 246 that provides, for a given transmedia content data item, a prediction of the suitability of a given branded content data item, e.g. an advertisement.

As shown in FIG. 7, the transmedia content recommender engine 238 additionally implements an optimisation component 248 which is configured to query at least the preference model component 242, and optionally the user-brand match component 244 and brand model component 246 by providing them with a transmedia content parameter identifying items of content in use, a user identification for the given user, or both a transmedia content parameter identifying items of content in use and a user identification for the given user. The optimisation component 248 acts on the suitability scores it receives to maximise content recommendations, user recommendations, or both content and user recommendations. Reference here to "content in use" generally means the content currently selected or being manipulated by the given user in the user interface 218.

For the case of preference model data only, the optimisation component 248 outputs to the control layer 232 all identifications for recommended content (or linked subsets) or users which have a determined suitability score which sufficiently meets a satisfactory threshold particular to the given user or content currently being utilised by the given user. By meeting a particular threshold, this may mean that the suitability score has to be above, or below a particular fixed vale, dependent on whether the score is arranged to be ascending or descending respectively in respect of suitability. Alternatively, the optimisation component 248 can rank suitability scores (either for all content or all content which sufficiently meets a threshold) and then output a predetermined number of different content or users identifications down from the top-ranked scores. For example, the optimisation component 248 may output identifications for transmedia content items (or linked content subsets) which been determined in respect of the given user to have the top X highest suitability scores (or lowest depending on whether scores are ascending or descending), as determined by the preference model 242, where X may be 5, 10, 20, 30, 40, 50 or 100. This one-dimensional optimisation ensures that the given user is engaged by relevant content, particularly in respect of linked content subsets.

In a further embodiment, a three-dimensional optimisation can additionally take into account user-brand matching and brand modelling. In this embodiment, the optimisation component 248 maximises the sum of the output for the preference model component 242, user-brand match component 244 and brand model component 246 over the transmedia content parameter. This three-dimensional optimisation can ensure that users are both engaged by relevant content, and the content being consumed content which is pertinent a brand relevant to the particular user or existing utilised content.

The recommender engine component 238 may also take into account a given user's defined preferences, historical behaviour and other predicted properties such as future user behaviour, or inferred properties such as an emotional state. In order to achieve this, the recommender engine component 238 communicates with the user model component 234 depicted in FIG. 3 and shown in more detail in FIG. 9.

Figure 9:
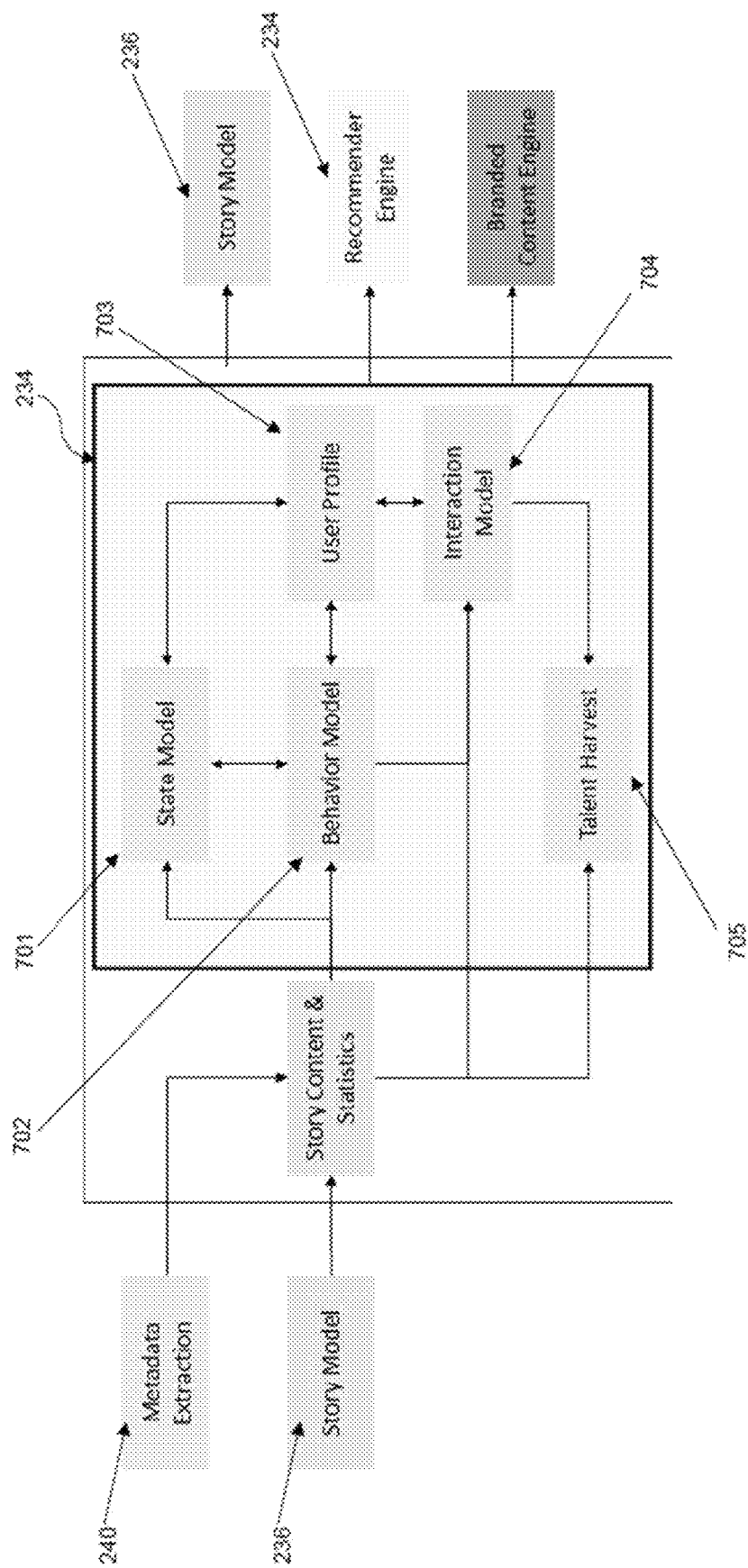
FIG. 9 depicts a user model component of the apparatus of the present disclosure.

FIG. 9 depicts data flows between some components of the backend device 230 in the context of the user model component 234, in particular, the input and output components of the user model component 234, many of which are also the input and output components of the recommender engine component 238. Referring to FIG. 9, the user model component 234, 234 includes a state model 701, behaviour model 702, user profile 703, interaction model 704 and talent harvest component 705.

Modelling the state of the user, using state model component 701 permits personalised recommendations to be provided by the recommender engine component 238, and also provides accurate predictions of user behaviour by the behaviour model component 702. The state model component 701 may also be used to customise the user interface 218 and encourage users to create new content, i.e. new transmedia content data items and time-ordered content links, within the system 200. The state model component 701 represents and predicts the continuous creational, emotional and affective state of users of the system 200. The creational state describes if the user is in the mood for consuming transmedia content subsets or non-linear networks or contributing their own transmedia content data items and time-ordered content links. The affective state indicates whether the user is, for example, motivated or bored. The emotional state describes the emotions that individual transmedia content data items or transmedia content subsets/non-linear networks trigger in the user.

Due to the hierarchy of the system, i.e. the logical separation of transmedia content into levels of the individual transmedia content data items, transmedia content subsets, non-linear networks and story universe, user behaviour is predicted at different levels of granularity in two main dimensions, namely: (1) the transmedia content hierarchy; and (2) the interaction of users with other users. User dynamics are of interest at different levels of user granularity, for example in respect of: single users, small groups, audiences. The behaviour model component 702 predicts the user behaviour in both of these dimensions and provides insights into dynamic behaviour for load balancing, information about the most likely path of a user through a given non-linear network and predicts the evolution of the whole system 200.

The user preference component 703 provides a detailed profiling for each user of the system 200, including, for example, demographics (e.g. age, gender, etc.), personality traits (e.g. Big 5) and location data (e.g. GPS).

The interaction model component 704 monitors and predicts social interactions of users. The analysis and prediction of social interactions of groups of contributors can be used by the system 200 to encourage collaboration across all levels of the system, predict the quality of stories and influence user community building.

Talent harvest component 705 identifies users of the system 200 with exceptional talent at creating transmedia content, and categorises these users according to their type of talent, e.g. a Star Wars expert, an artist doing funny comic strips or a user resonating with a specific audience.

As shown in FIG. 9, the user model component 234 is in communication with the story model component 236, the recommender engine component 238 and the metadata extraction component 240, with these components being both inputs and outputs to the user model component 234, allowing data exchange therebetween.

The state model component 701 within the user model predicts or infers the state of a given user from (noisy) observations of the user interacting with the system 200. The state model component 701 uses a statistical model, such as a hidden Markov model to infer a creational state of the user (i.e. on a scale from creative to consumptive; see FIG. 1), the user's emotional state (e.g. sad, happy, excited, etc.) and the affective state of the user (e.g. engaged with the system 200, bored, etc.). The state model component 701 further classifies these continuous states into a set of discrete states for further processing (or similar). The observed variables include the profile of the user (e.g. personality), the history of interactions of the user with the system, properties of stories/story elements the user is actually consuming or creating, the environment of the user (e.g. office) and temporal metrics (e.g. working day versus weekends).

The state model component 701 represents user behaviour across different scales/levels of the system (i.e. individual transmedia content data items, transmedia content sub-sets or non-linear networks) by creating a hierarchical, graph-based user model that refines modelled action and states with every level. User behaviour is modelled across different levels of granularity: crowd (e.g, predict behaviour of large numbers of users), community (e.g. defined, sorted groups of users), and at an individual level.

Figure 11:
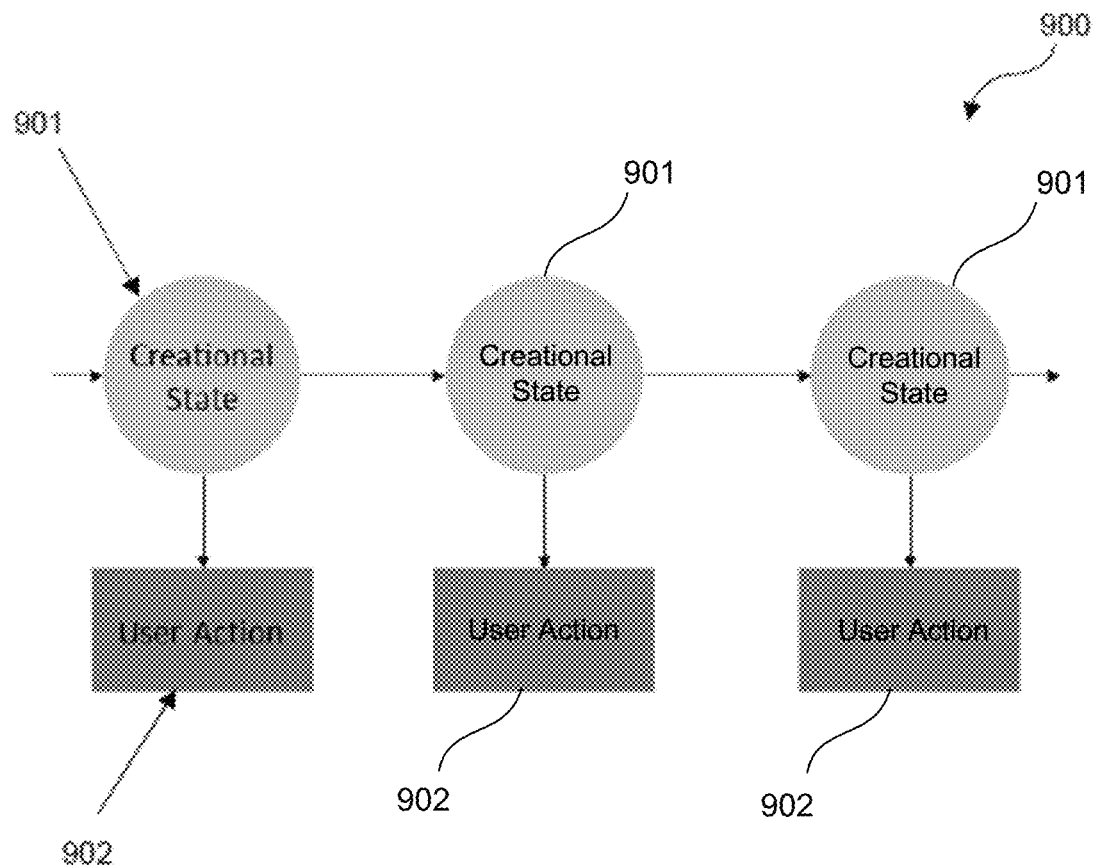
FIG. 11 depicts how user state and actions can be modelled according to the system.

In one embodiment of the invention, the user state and actions are represented by a Hidden Markov Model 900, depicted in FIG. 11. In this case, the latent variable 901 represents the creational state of the user. The observed variable 902 represents the actions of the user, such as "consuming a transmedia content data item", "rating a transmedia content subset", "creating a new transmedia content data item", etc. The creational state changes dynamically over time and can be inferred from these observed user actions. As a Dynamic Bayesian Network (DBN), this representation can be extended to include the engagement and emotional state of the user as well as the interactions between users.

Navigating through a large quantity of transmedia content data items, transmedia content subsets and non-linear networks that are provided to users by the system 200, in a way that users and user groups can create and consume the data quickly on a range of devices, including personal computers, laptops, tablets, mobile devices etc. is challenging. The user interface component 218 guides the user in a non-disruptive way, whilst also avoiding repetitive meandering and visual overload of content creation and navigation tools on the multiple, hierarchical levels of the transmedia content.

The user interface component 218 presents the transmedia content data items, transmedia content subsets and non-linear networks as follows. A three-dimensional representation can be utilised based on one or more three-dimensional shapes which can be manipulated by the user. In a two-dimensional system involving a two-dimensional display screen, a two-dimensional representation of the three-dimensional shape(s) is/are generated, and the shape(s) utilised may be one or more spheres or ellipsoids, which use hierarchically-connected visual metaphors to provide further information on the transmedia content data items and how they are related and connected in a time-based manner for users and groups of users. This is achieved in a non-disruptive and non-distracting manner. It will be appreciated that any three-dimensional object may be used to present the transmedia content. In one embodiment of the present invention, the visual metaphors can equate to features of a planet, such as continental landmasses, oceans, clouds, mountain ranges and coastlines.

Figure 10B:
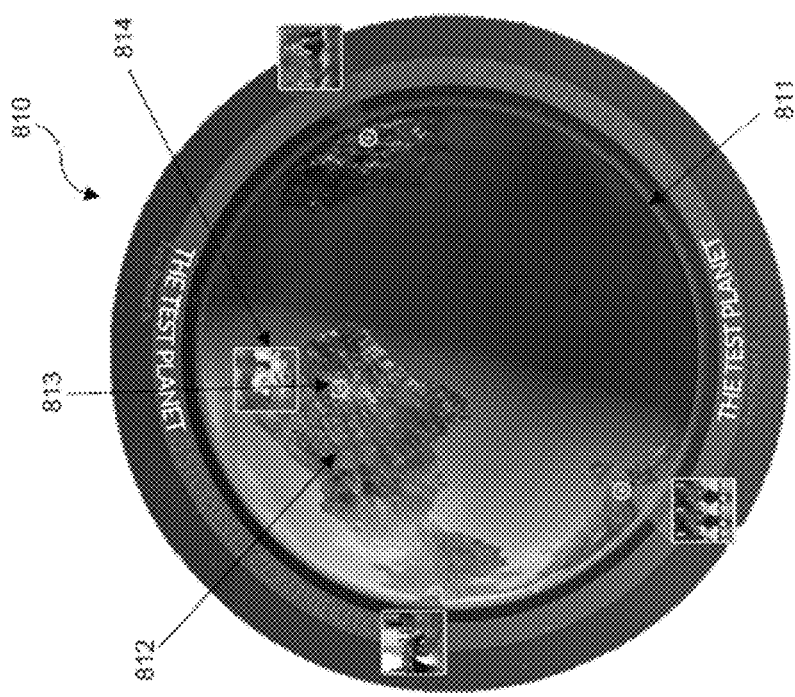
FIGS. 10A and 10B depict exemplary user interfaces that are rendered and output by the system.
Figure 10A:
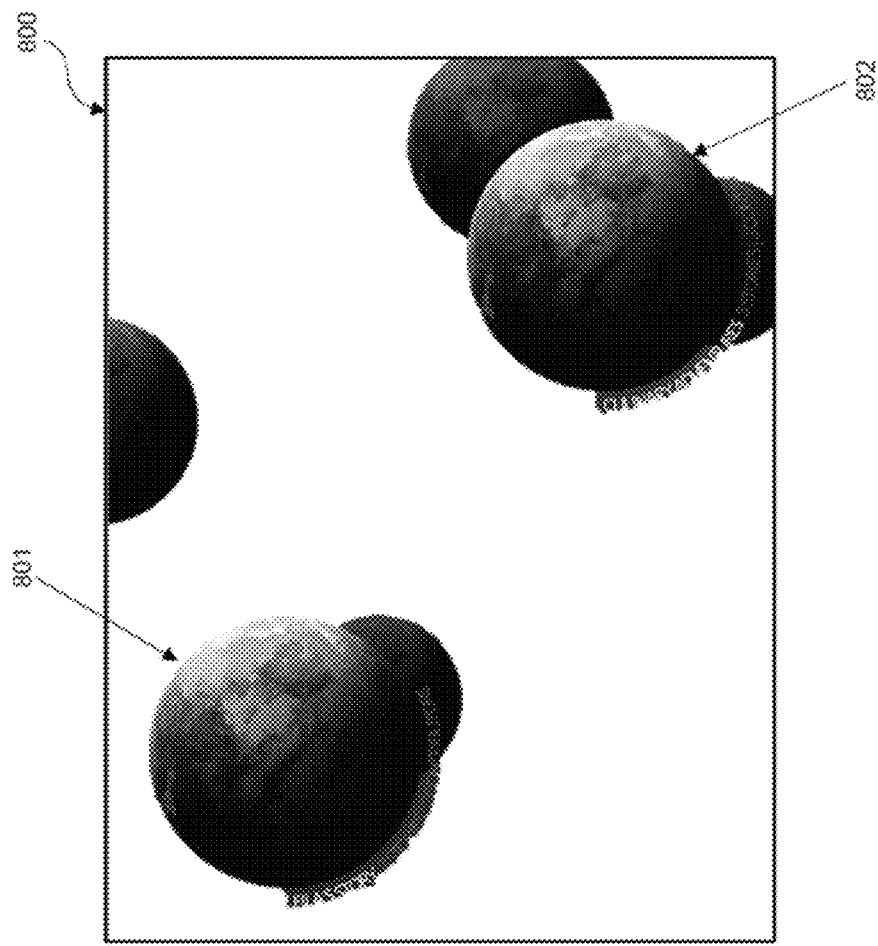

FIGS. 10A and 10B depict an example of the user interface that is presented to a user of the system 200 at different levels of the hierarchical tree structure. FIG. 10A depicts a higher-level view of the transmedia content 800 which depicts several spheres 801, 802. Each sphere 801, 802 represents a storyworld, i.e. groups of transmedia content subsets and non-linear networks that are semantically similar, e.g. the constituent transmedia content data items relate to the same story characters or story universe. The spheres themselves may be visually clustered together in the displayed three-dimensional representation according to semantic similarity between the storyworlds.

A user may select one of the spheres 801, 802, which causes the user interface 800 to transition to a modified user interface 810, which depicts the selected single sphere 811 with additional detail. Additional surface features of the selected sphere 811 are displayed in user interface 810, such as individual transmedia content subsets or non-linear networks indicated by icons 813, and representative images of the content 814. The visual metaphors are provided such that semantically similar transmedia content subsets and non-linear networks are depicted on the same continents 812 on the surface of the planet 811. When a user wishes to consume or edit an individual transmedia content subset or non-linear network, the user can select one of the icons 813 or images 814 and the user interface 810 transitions to show a graph-structure of the subset/network, the individual transmedia content data items, or both the subset/network and the individual transmedia content data items.

Figure 12:
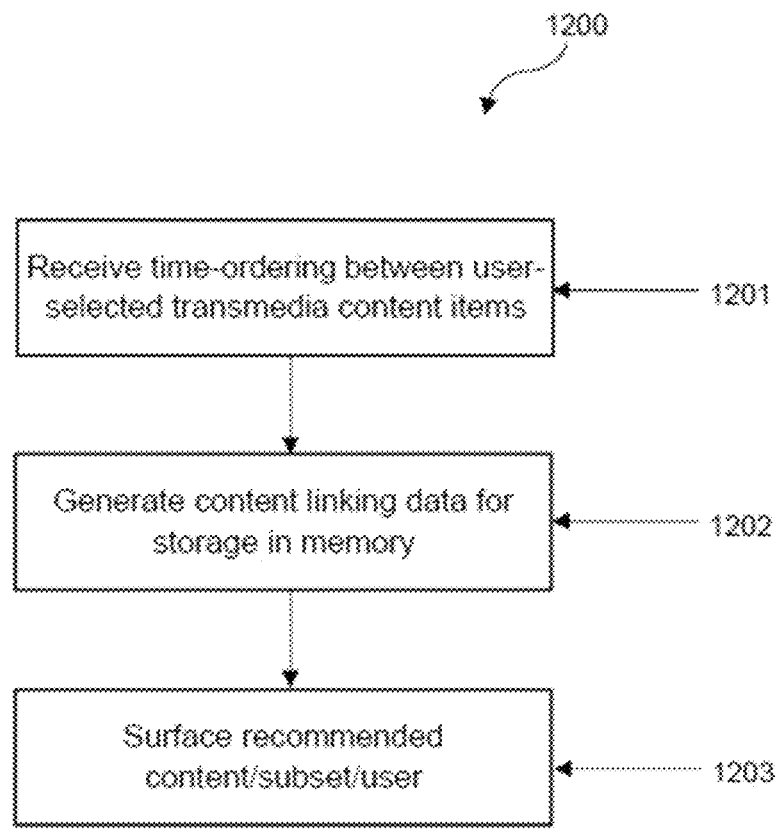
FIG. 12 depicts a method for surfacing transmedia content to a user according to the present disclosure.

FIG. 12 depicts a method for surfacing transmedia content to a given user of the system 200 from the memory 301 of the server device 230. At step 1201, the server device 230 receives, e.g. via the network interface, user input indicative of a time-ordering between at least two user-selected transmedia content items. At step 1202, the processing circuitry 302 of the server device 230 generates, using a transmedia content linking engine, the content linking data for storage in the memory 301 thereby defining a linked transmedia content subset including the at least two user-selected transmedia content items. At step 1203, the processing circuitry 302 accesses the memory 301 and surfaces one or more of: transmedia content items, linked transmedia content, identifications of identified users other than the given user and the content items associated with at least one identified user other than the given user. The surfaced content items or the surfaced linked transmedia content subsets are surfaced for selection by the given user via the transmedia content linking engine as one or more user-selectable transmedia content items.

In addition or alternatively to the applications described above the recommender engine 238, the user model 234, or both the recommender engine and user model may be used to identify one or more transmedia content data items, typically an image or video file or except, for insertion within another transmedia content data item, again typically an image or video file. In the present context, the term "insertion" is taken to mean the insertion of the second transmedia content data item within the first such that the second appears as part of the first, e.g, within a scene depicted in an image or video. In a first example, the first transmedia content data item is a video depicting a scene, and the second transmedia content data item is an image. The second transmedia content data item is inserted into the first transmedia content data item such that the image is shown within the scene, for example on a wall, in place of a poster or billboard, within in a picture frame or any other suitable location or element within the scene. Methods for identifying suitable locations for inserting the second transmedia content data item are described in more detail below with respect to FIG. 13.

Generally, both transmedia content data items will be visual media items that are formed of image data, for example images or videos, and may be in any suitable format such as bitmap, PNG, TIFF, or JPEG or, for videos, MP4, FLV, GIF, QuickTime, WMV or similar, and may use any appropriate encoding. The resulting combined visual media item will be of the appropriate format to encode the combined visual media item. For example, where an image is inserted into an image, the output combined visual media item will be also be an image. Where a video is inserted into an image, however, the combined output will be a video in order to support the inclusion of the video. Furthermore, it should be understood that the methods and systems described herein may be used to insert any type of visual media into another type of visual media, e.g. an image into an image, an image into a video, a video into an image, or a video into an image.

To enable the insertion of second visual media items into the first visual media items, the system 200 described above further includes a content selection engine that is used to identify the appropriate second visual media item to be inserted into the first and a video processing component that allows for the embedding of the second visual media items into the first. The system 200 may also consider the positioning of the second visual media item within the first in order to optimise its perception by a user, e.g. by placing the second visual media item in the periphery (offcenter, background for visual content), or on salient, central foreground parts. The placement can be further optimized according to the media content, preservation of overall perception of the first visual media content, camera tracking stability, visual quality of the content, color, cinematography, shot duration, or saliency. Furthermore, geometric appearance, composition and structure of a scene, e.g., using depth information can be taken into account, as described in more detail below. It should also be understood that other types of content such as audio or text can also be inserted into the first visual media item, in which case audio content properties such as volume, level of noise, frequency spectrum will be considered. For text, environmental descriptions, semantics and text layout may be taken into account.

By employing these methods, the system 200 achieves the optimized embedding of content in an automatic way and without restricting generality to be scalable to a large amount and wide variety of data and to be able to process different media types. For example for visual media content, possible locations for inserting branded content can be determined by locating e.g. flat, homogeneous, repetitive textured areas by using one or more of homographies, texture segmentation, color segmentation and a learning approach. Combined with a saliency map this allows to solve for the best location e.g. by providing probabilities of suitability for patches. To insert the content automatically with the correct perspective transformation, one or more of: line detection, vanishing point computation and rectifying regular texture can be used to determine the correct transformation on flat as well as curved surfaces, to retarget arbitrary input media types to match the output media type. In case of videos, structure from motion can be used to get the 3D structure of the scene and the camera poses based on which the brand content can be inserted.

To select the best visual content to be included in a scene a measurement of the matching of e.g. the color histograms can be used. The matching of the second visual media item to the first visual media item may also be achieved by analyzing and matching metadata and user preferences in the optimization engine.

If desired, the system can actively steer the users attention towards the inserted content, e.g., by placing it in a very salient way in the target media (using the above mentioned saliency analysis), or in more subtle ways, e.g., by adjusting the flow of the story and media presentation such that the user eventually discovers the inserted content while viewing the first visual media item.

Figure 13:
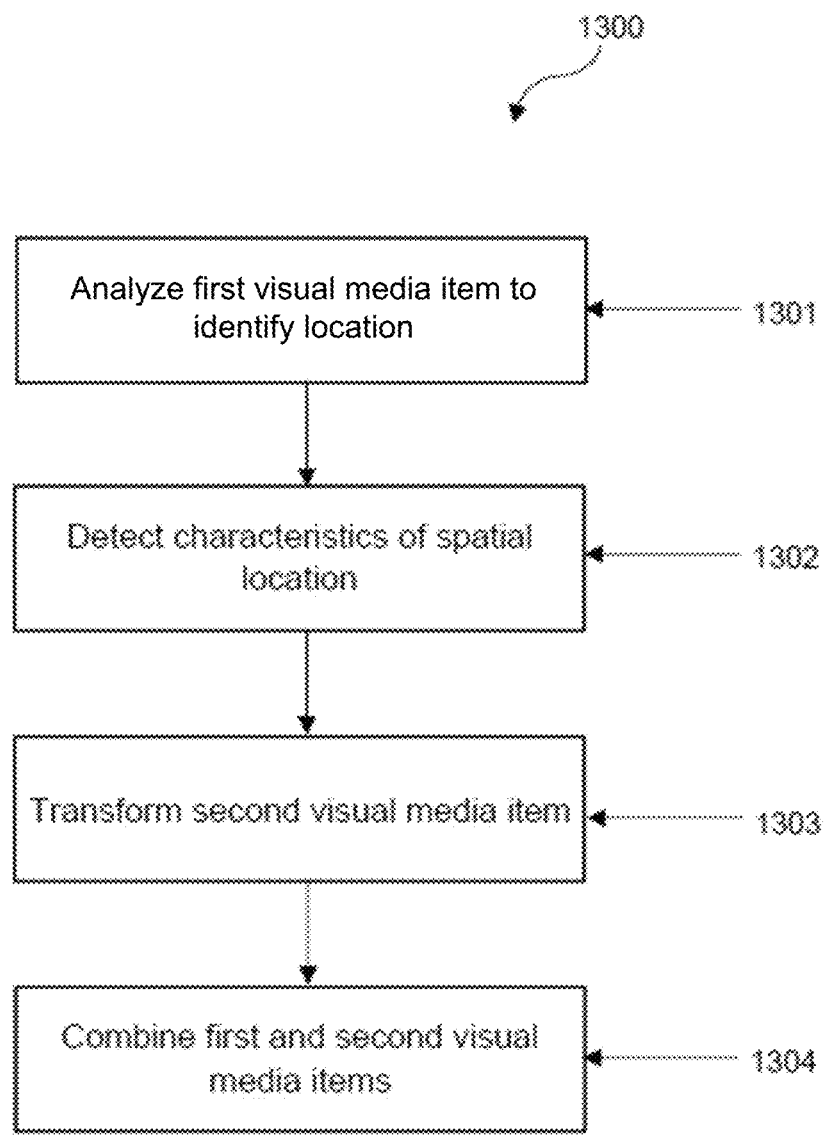
FIG. 13 depicts a method for inserting a second transmedia content data item into a first transmedia content data item.

FIG. 13 depicts a process 1300 in line with the above discussion for inserting a second visual media item into a first visual media item, such as an image or video. At step 1301, the first visual media item is analysed to identify one or more spatial locations within the visual media item that are suitable to insert the second visual media item. The analysis involves one or more of searching for flat, homogeneous, and repetitive textured areas with the image data of the first visual media item using one or more of homographies, texture segmentation, colour segmentation, saliency mapping and machine learning techniques. The analysis may also take into account characteristics of the second visual media item to identify locations for insertion, such as dimensions or an aspect ratio of the second visual media item, the length of the second visual media item where it is a video, or the colour and lighting properties of the second visual media item.

In scenarios where a number of spatial locations are identified at step 1301, the method 1300 may further comprise analysing each of the identified spatial locations to determine a preferred spatial location. Again, the analysis may also take into account characteristics of the second visual media item to identify locations for insertion, such as dimensions or an aspect ratio of the second visual media item, the length of the second visual media item where it is a video, or the colour and lighting properties of the second visual media item, in order to determine the preferred spatial location.

Where the first visual media item is a video, it may also be necessary to identify one or more temporal locations to insert the second visual media item. For example, a spatial location that is identified in one or more video frames at one time point, or temporal location, may not be present in subsequent or preceding frames. The step of identifying one or more temporal locations can include analysing the image data of the first visual media item to detect shot transitions to give an indication of the temporal coordinates of a single shot, within which the objects or surfaces within the scene are more likely to be consistently displayed.

At step 1302, characteristics of the one or more identified spatial locations are detected. If the one or more spatial locations have already been narrowed down to a single preferred spatial location, then only the characteristics of that preferred spatial location may be determined. The characteristics of the spatial locations that are identified include one or more of the shape, angle and perspective of a surface at the spatial location, and are detecting using one or more of line detection, vanishing point computation and rectifying regular texture. In essence, the purpose of detecting the characteristics of the identified spatial locations is to gather the necessary information required to transform the second visual media item such that it fits seamlessly into the scene depicted in the first visual media item, as described at step 1303.

When the first visual media item is a video, the step of detecting characteristics of the identified spatial locations can also involve determining the characteristics of the identified spatial locations at the identified temporal locations by measuring of the stability of tracking, as measured by one or more of KLT tracking, SfM (structure from motion), and improved tracking for planes, in the image data of the first visual media item, and may further involve analysing motion of the spatial location within the image data of multiple video frames across the temporal location to determine the 3-dimensional structure of the spatial location.

If the identified spatial locations have not already been narrowed down to a single preferred spatial location, the characteristics determined at step 1302 may also be used as part of the decision making process to determine which of the identified spatial locations best enables the insertion of the second visual media item.

As mentioned above, the second visual media item is transformed according to the detected characteristics of the spatial location at step 1303, for example, by deforming and scaling the second visual media item to fit the available area at the identified spatial location(s).

At step 1304, the first visual media item and second visual media item are combined to create the combined visual media item by inserting the transformed second visual media item into the first visual media item at the one or more identified spatial locations such that when the combined visual media item is output the second visual media item is displayed within the first media item at the one of more identified spatial locations. As explained above, the second visual media content item is inserted within the first such that the second appears as part of the first, e.g. within a scene depicted in an image or video, as though it were part of the scene that was photographed or filmed.

A further aspect of the process involves the selection of the second visual media item that is to be inserted into the first visual media item. The selection may be carried out based on the visual properties and characteristics of the first and a number of candidate second visual media items, or it may be based on the semantic content of candidate second visual media items, employing the recommender engine, the user model or both the recommender engine and user model to match appropriate second visual media items using the methods described above. For example, the method described with respect to FIG. 8 may equally be applied to the individual visual media elements and, based on the preferences of an individual user, appropriate second visual media items may be identified for insertion into first visual media items using the preference model. Of course, the process of selecting a second visual media item may involve a combination of both the analysis of visual properties and of user preferences.

Where the second visual media item is selected based on an analysis of the visual properties of the visual media items, based on an analysis of colour, or lighting or colour and lighting in the first visual media item at the identified spatial location and each candidate second visual media item.

While some exemplary embodiments of the present disclosure have been shown in the drawings and described herein, it will be appreciated that the methods described herein may be deployed in part or in whole through a computing apparatus that executes computer software, program codes, or instructions on processing circuitry, which may be implemented by or on one or more discrete processors. As a result, the claimed electronic device, apparatus and system can be implemented via computer software being executed by the processing circuitry. The present disclosure may be implemented as a method in a system, or on an apparatus or electronic device, as part of or in relation to the apparatus or device, or as a computer program product embodied in a computer readable medium executable on one or more apparatuses or electronic devices.

A processor as disclosed herein may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. Each processor may be realized as one or more microprocessors, microcontrollers, embedded microcontrollers, programmable digital signal processors or other programmable device, along with internal or external memory. A given processor may also, or instead, be embodied as an application specific integrated circuit, a programmable gate array, programmable array logic, or any other device or combination of devices that may be configured to process electronic signals. In addition, each processor may enable execution of multiple programs, threads, and codes. The threads may be executed simultaneously to enhance the performance of the processor and to facilitate simultaneous operations of the application. By way of implementation, the methods, program codes, program instructions and the like described herein may be implemented in one or more thread. The thread may spawn other threads that may have assigned priorities associated with them; the processor may execute these threads based on priority or any other order based on instructions provided in the program code.

Each processor may access one or more memories, for example one or more non-transitory storage media which store the software, executable code, and instructions as described and claimed herein. A storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and processes disclosed herein, and steps associated therewith, may be realized in hardware, software or a combination of hardware and software suitable for a particular application. The hardware may include a general purpose computer or dedicated computing device or specific computing device or particular aspect or component of a specific computing device.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, the methods described above and combinations thereof may be embodied in computer executable code that, when executing on one or more computing devices, performs the steps thereof. In another aspect, the methods may be embodied in a system that performs the steps thereof, and may be distributed across electronic devices in a number of ways, or all of the functionality may be integrated into a dedicated, standalone electronic device or other hardware. In another aspect, the means for performing the steps associated with the processes described above may include any of the hardware or software described above.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising", "having", "including", and "containing" are to be construed as open-ended terms (i.e. meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g. "such as") provided herein, is intended merely to better illuminate the disclosure and does not pose a limitation on the scope of the disclosure unless otherwise claimed.

The present disclosure has been provided above by way of example only, and it will be appreciated that modifications of detail can be made within the scope of the claims which define aspects of the invention.

The invention claimed is:

1. A computer-implemented method for inserting a second visual media item into a first visual media item, visual media items being formed of image data, the method comprising:
analyzing the first visual media item to identify one or more spatial locations to insert the second visual media item within image data of the first visual media item;
detecting characteristics of the one or more identified spatial locations within the first visual media item;
transforming the second visual media item according to the detected characteristics; and
combining the first visual media item and the second visual media item by inserting the transformed second visual media item into the first visual media item at the one or more identified spatial locations such that when the combined visual media item is output the second visual media item is displayed within the first visual media item at the one or more identified spatial locations;
wherein the second visual media item is selected from a collection of candidate visual media items based on:
an analysis of color, lighting, or color and lighting in the first visual media item at the one or more identified spatial locations and each candidate visual media item, or
a comparison of at least two of: metadata of the first visual media item, metadata of each candidate visual media item, or user preference data.

2. The method of claim 1, wherein analyzing the first visual media item to identify the one or more spatial locations comprises searching for one or more of flat, homogeneous, or repetitive textured areas within the image data of the first visual media item using one or more of homographies, texture segmentation, color segmentation, saliency mapping or machine learning techniques.

3. The method of claim 2, further comprising analyzing the one or more identified spatial locations to determine one or more preferred spatial locations.

4. The method of claim 1, wherein detecting characteristics of the one or more identified spatial locations comprises employing one or more of line detection, vanishing point computation, or regular texture rectification to determine spatial characteristics of the one or more identified spatial locations.

5. The method of claim 1, wherein the first visual media item is an image.

6. The method of claim 1, wherein the first visual media item is a video, and wherein the image data of the first visual media item comprises video frames.

7. The method of claim 6, further comprising analyzing the first visual media item to identify one or more temporal locations to insert the second visual media item within the image data of the first visual media item.

8. The method of claim 7, wherein the first and second visual media items are combined such that when the combined visual media item is output, the second visual media item is displayed within the first visual media item at the one or more identified spatial locations and the one or more temporal locations.

9. The method of claim 7, wherein identifying one or more temporal locations comprises analyzing the image data of the first visual media item to detect shot transitions.

10. The method of claim 9, wherein determining the characteristics of the one or more identified spatial locations comprises determining the characteristics of the one or more identified spatial locations at the one or more temporal locations by measuring a stability of tracking in the image data of the first visual media item.

11. The method of claim 10, wherein the stability of tracking is measured by Kanade-Lucas-Tomasi (KLT) tracking, structured from motion (SfM), or improved tracking for planes.

12. The method of claim 9, wherein determining the characteristics of the one or more identified spatial locations comprises analyzing motion of a spatial location within image data of multiple video frames across the one or more temporal locations to determine a 3-dimensional structure of the spatial location.

13. The method of claim 1, wherein the second visual media item is an image or a video.

14. The method of claim 1, wherein the characteristics of the one or more identified spatial locations comprise one or more of a shape, an angle, or a perspective of a surface of the one or more identified spatial locations.

15. A non-transitory computer-readable medium containing computer readable instructions which, when executed by processing circuitry, cause the processing circuitry to:
analyze a first visual media item to identify one or more spatial locations to insert a second visual media item within image data of the first visual media item;
detect characteristics of the one or more identified spatial locations within the first visual media item;
transform the second visual media item according to the detected characteristics; and
combine the first visual media item and the second visual media item by inserting the transformed second visual media item into the first visual media item at the one or more identified spatial locations such that when the combined visual media item is output, the second visual media item is displayed within the first visual media item at the one or more identified spatial locations,
wherein the second visual media item is selected from a collection of candidate visual media items based on:
an analysis of color, lighting, or color and lighting in the first visual media item at the one or more identified spatial locations and each candidate visual media item, or
a comparison of at least two of: metadata of the first visual media item, metadata of each candidate visual media item, or user preference data.

16. The non-transitory computer-readable medium of claim 15, wherein detecting characteristics of the one or more identified spatial locations comprises employing one or more of line detection, vanishing point computation, or regular texture rectification to determine spatial characteristics of the one or more identified spatial locations.

17. The non-transitory computer-readable medium of claim 15, wherein the characteristics of the one or more identified spatial locations comprise one or more of a shape, an angle, or a perspective of a surface of the one or more identified spatial locations.

18. An electronic device comprising:
processing circuitry; and
a memory coupled with and readable by the processing circuitry and storing therein a set of instructions which, when executed by one or more processors, cause the one or more processors to:
analyze a first visual media item to identify one or more spatial locations to insert a second visual media item within image data of the first visual media item;
detect characteristics of the one or more identified spatial locations within the first visual media item;
transform the second visual media item according to the detected characteristics; and
combine the first visual media item and the second visual media item by inserting the transformed second visual media item into the first visual media item at the one or more identified spatial locations such that when the combined visual media item is output, the second visual media item is displayed within the first visual media item at the one or more identified spatial locations,
wherein the second visual media item is selected from a collection of candidate visual media items based on:
an analysis of color, lighting, or color and lighting in the first visual media item at the one or more identified spatial locations and each candidate visual media item, or
a comparison of at least two of: metadata of the first visual media item, metadata of each candidate visual media item, or user preference data.

19. The electronic device of claim 18, wherein detecting characteristics of the one or more identified spatial locations comprises employing one or more of line detection, vanishing point computation, or regular texture rectification to determine spatial characteristics of the one or more identified spatial locations.

20. The electronic device of claim 18, wherein the characteristics of the one or more identified spatial locations comprise one or more of a shape, an angle, or a perspective of a surface of the one or more identified spatial locations.

* * * * *

UNITED STATES PATENT AND TRADEMARK OFFICE
CERTIFICATE OF CORRECTION

PATENT NO. : 10,580,165 B2  
APPLICATION NO. : 15/715935  
DATED : March 3, 2020  
INVENTOR(S) : Alex Sorkine-Hornung et al.

Page 1 of 1

It is certified that error appears in the above-identified patent and that said Letters Patent is hereby corrected as shown below:

On the Title Page

Item "(72) Inventors:", Line 2:
Replace "(US); Simone Meier, Burbank, CA" with -- (US); Simone Meyer, Burbank, CA --

Signed and Sealed this
Tenth Day of November, 2020

Andrei Iancu
*Director of the United States Patent and Trademark Office*